UNITED STATES PATENT OFFICE.

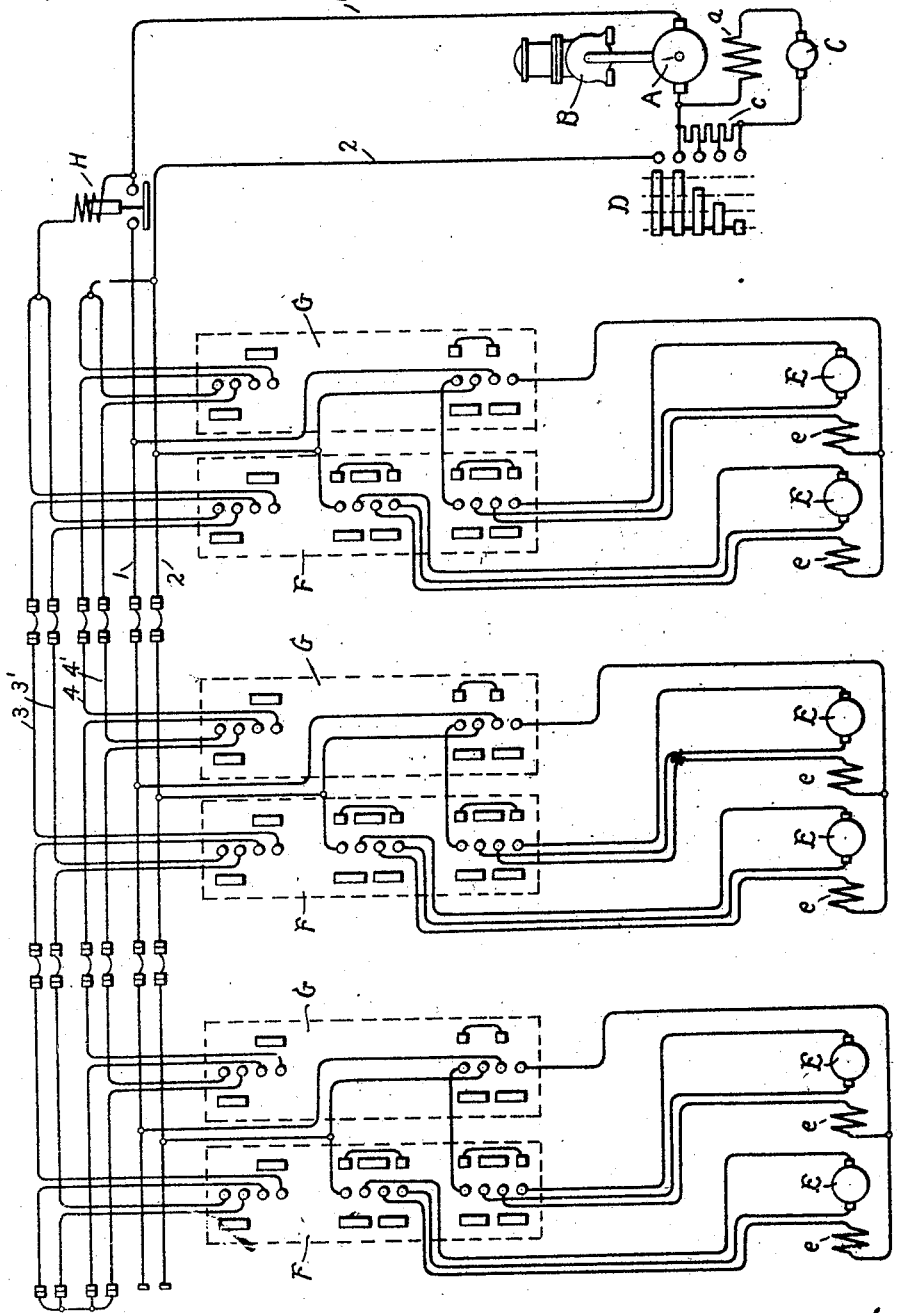

MAX R. HANNA, OF SCHENECTADY, NEW YORK, ASSIGNOR TO GENERAL ELECTRIC COMPANY, A CORPORATION OF NEW YORK.

MOTOR-CONTROL SYSTEM.

1,019,461.   Specification of Letters Patent.   Patented Mar. 5, 1912.

Application filed September 18, 1911. Serial No. 649,862.

*To all whom it may concern:*

Be it known that I, MAX R. HANNA, a citizen of the United States, residing at Schenectady, county of Schenectady, State of New York, have invented certain new and useful Improvements in Motor-Control Systems, of which the following is a specification.

My invention relates to the control of motor-operated trains in which there are a plurality of cars each equipped with driving motors, but in which the current for the motors is supplied from a source of current carried on one of the cars. On such a train the motors may ordinarily be controlled from the car on which the source of current is located by controlling the voltage of the source, so that magnetically - actuated switches, or their equivalent, are not required on the several cars. It may, however, be desirable, in order to reduce to a minimum the number of power wires extending through the train to provide independent reversing switches on the several cars, which may be thrown manually to the proper position at the beginning of each run. It may also be desirable to provide manually-operated switches on the several cars for connecting the motors in series or in parallel so that when the train is heavily loaded the motors may be operated in parallel, and when the train is lightly loaded, in series. If such independent switches are provided on the several cars, it is possible by wrongly throwing some of the switches to establish various wrong circuit combinations so that some of the motors may be working against others, or some may be in parallel, while others are in series.

In the system which constitutes my invention independent switches are provided on the several cars, as described above, and means are also provided for preventing the supply of current to the motors unless all the independent switches on the several cars are in the same position.

My invention will best be understood by reference to the accompanying drawing which shows diagrammatically a motor control system arranged in accordance with my invention.

In the drawing, A represents the armature of a generator, carried on one of the cars and driven by prime mover B, such, for instance, as a gasolene engine. The field winding $a$ of the generator is preferably separately excited so as to permit a variation of the generator voltage over a wide range, and such an exciter is indicated at C, connected in series with the generator field winding $a$ through a resistance $c$.

D represents the controlling switch for connecting the generator armature A to the power supply circuit, indicated by the conductors 1, 2, extending through the train, and to vary the amount of resistance $c$ in the field circuit so as to control the voltage of the generator.

The head car, as well as each of the following cars, is equipped with driving motors. The motor armatures are indicated at E E and the fields at $e\ e$. On each car is provided a manually-operated reversing switch F and a series-parallel switch G. The contacts comprised in each switch are inclosed in dotted lines. It will be seen that the reversing switch F comprises three groups of contacts, of which the central and lower groups control the relative connections of field and armature of the two motors, respectively. The upper group of contacts, which are auxiliary contacts, not included in the motor circuit, are connected to two parallel conductors 3 and 3' extending through the train. Similarly, the series parallel switch G has a lower group of main contacts which serve to connect the two motors in series or in parallel, and an upper group of auxiliary contacts connected to the two parallel conductors 4 and 4' extending through the train. The conductor 3 passes in series through a pair of auxiliary contacts upon each reversing switch, which are closed only when the reversing switch is thrown to one of its operative positions, and these contacts are like contacts on the several switches F, so that all of the switches F must be in the same operative position in order to close the circuit of conductor 3 from one end of the train to the other. The conductor 3' is similarly arranged with respect to contacts which are closed when the switches F are in their other operative position. Therefore, the one or the other of conductors 3 and 3' has its circuit closed through the train when, and only when, all the switches F are in one or the other of their two operative positions.

The arrangement of conductors 4 and 4' with respect to the auxiliary contacts on switches G is the same as that of conductors 3 and 3' with respect to the auxiliary contacts on switches F, so that one or the other of conductors 4 and 4' has its circuit closed through the train when, and only when, all the switches G are in the same operative position. Conductors 3 and 3' are connected at the rear of the train to conductors 4 and 4' so as to establish a circuit the length of the train and back, and in order that this complete circuit should be closed it is necessary that all the switches F should be in the same position and that all the switches G should be in the same position.

At the front end of the train, conductors 4 and 4' are connected to conductor 2, while conductors 3 and 3' are connected to conductor 1 through the actuating winding of a magnetically-actuated switch H, the contacts of which are included in conductor 1. The winding of switch H can therefore be energized only when the independent switches on all the cars are in the same position, and until this winding is energized the supply circuit is open at the contacts of switch H. In other words, the supply of current from the generator A to all the motors is dependent on all the independent switches being in proper position.

I do not desire to limit myself to the particular arrangement and connections shown and described, but aim in the appended claims to cover all modifications which are within the scope of my invention.

What I claim as new and desire to secure by Letters Patent of the United States, is,

1. In a motor operated train, a plurality of cars each equipped with driving motors, a source of current on one car for supplying all the motors of the train, independent switches on the several cars located in the motor circuits, and means controlled by each of said switches for controlling the supply of current from said source to all the motors.

2. In a motor operated train, a plurality of cars each equipped with driving motors, a source of current on one car for supplying all the motors of the train, independent means on each car for controlling the motor circuits thereon, and means for preventing the supply of current from the source to all the motors except when the motor circuit connections are the same on all the cars.

3. In a motor operated train, a plurality of cars each equipped with driving motors, a source of current on one car for supplying all the motors of the train, a supply circuit extending through the train to which the motor circuits on the several cars are connected in parallel, independent switches on the several cars included in said motor circuits, a control circuit extending through the train including in series contacts controlled by said independent switches, and means controlled by said control circuit for controlling said supply circuit.

4. In a motor operated train, a plurality of cars each equipped with driving motors, a source of current on one car for supplying all the motors of the train, a supply circuit extending through the train to which the motor circuits on the several cars are connected, independent switches on the several cars included in said motor circuits, and means for preventing the closing of said supply circuit except when all of said switches are in the same position.

5. In a motor operated train, a plurality of cars each equipped with driving motors, a source of current on one car for supplying all the motors of the train, a supply circuit extending through the train to which the motor circuits on the several cars are connected in parallel, a second circuit extending through the train, and independent switches on the several cars included in the motor circuits and having auxiliary contacts, said auxiliary contacts on the several cars being in series in said second circuit.

6. In a motor operated train, a plurality of cars each equipped with driving motors, a source of current on one car for supplying all the motors of the train, independent switches on the several cars included in the motor circuits, each having a plurality of operative positions, and a plurality of parallel conductors extending through the train each passing in series through like contacts on said independent switches on the several cars, said contacts on each switch being closed only when said switch is in one of its operative positions, whereby one or the other of said parallel conductors has its circuit closed when, and only when, all said independent switches are in the same operative position.

7. In a motor operated train, a plurality of cars each equipped with driving motors, a source of current on one car for supplying all the motors of the train, a supply circuit extending through the train to which the motor circuits on the several cars are connected in parallel, independent switches on the several cars included in said motor circuits, each having a plurality of operative positions, a plurality of parallel conductors extending through the train each passing in series through like contacts on said independent switches on the several cars, said contacts on each switch being closed only when said switch is in one of its operative positions, whereby one or the other of said parallel conductors has its circuit closed when, and only when, all said independent switches are in the same operative position, and a magnetically-controlled switch having its winding in series with said conductors and its contacts controlling said supply circuit.

8. In a motor operated train, a plurality of cars each equipped with driving motors, a source of current on one car for supplying all the motors of the train, a supply circuit extending through the train to which the motor circuits on the several cars are connected in parallel, a second circuit extending through the train, and independent switches on the several cars included in the motor circuits and having contacts included in said second circuit, said contacts on the several cars being in series in said second circuit, and a magnetically-controlled switch having its winding included in said second circuit and its contacts controlling said supply circuit.

9. In a motor operated train, a plurality of cars each equipped with driving motors, a source of current on one car for supplying all the motors of the train, a supply circuit extending through the train to which the motor circuits on the several cars are connected in parallel, independent switches on the several cars included in said motor circuits, a control circuit extending through the train including in series contacts controlled by said independent switches, and a magnetically-controlled switch having its winding included in said control circuit and its contacts controlling said supply circuit.

10. In a motor operated train, a plurality of cars each equipped with driving motors, a source of current on one car for supplying all the motors of the train, a supply circuit extending through the train to which the motor circuits on the several cars are connected in parallel, a second circuit extending through the train, and independent switches on the several cars included in the motor circuits each having a plurality of operative positions, and like auxiliary contacts on said independent switches closed in like positions thereof included in series in said second circuit.

11. In a motor operated train, a plurality of cars each equipped with driving motors, a source of current on one car for supplying all the motors of the train, a supply circuit extending through the train to which the motor circuits on the several cars are connected in parallel, a second circuit extending through the train, and independent switches on the several cars included in the motor circuits each having a plurality of operative positions, like auxiliary contacts on said independent switches closed in like positions thereof included in series in said second circuit, and means controlled by said second circuit controlling said supply circuit.

12. In a motor operated train, a plurality of cars each equipped with driving motors, a source of current on one car for supplying all the motors of the train, independent switches on the several cars included in the motor circuits, each having a plurality of operative positions, a plurality of parallel conductors extending through the train, and a plurality of sets of auxiliary contacts on each of said switches, one set being closed in each of the operative positions of the switch, like sets of contacts on the switches on the several cars being included in series in each of said parallel conductors, whereby one or the other of said conductors has its circuit closed when, and only when, said switches are all in the same operative position.

13. In a motor operated train, a plurality of cars each equipped with driving motors, a source of current on one car for supplying all the motors of the train, independent switches on the several cars included in the motor circuits, each having a plurality of operative positions, a plurality of parallel conductors extending through the train, and a plurality of sets of auxiliary contacts on each of said switches arranged to close the circuit of one or the other of said parallel conductors when, and only when, said switches are all in the same operative position.

14. In a motor operated train, a plurality of cars each equipped with driving motors, a source of current on one car for supplying all the motors of the train, a supply circuit extending through the train to which the motor circuits on the several cars are connected in parallel, independent switches on the several cars included in said motor circuits, each having a plurality of operative positions, a plurality of parallel conductors extending through the train, a plurality of sets of auxiliary contacts on each of said switches arranged to close the circuit of one or the other of said parallel conductors when, and only when, said switches are all in the same operative position, and a magnetically-controlled switch having its winding in series with said parallel conductors and its contacts controlling said supply circuit.

15. In a motor operated train, a plurality of cars each equipped with driving motors, a source of current on one car for supplying all the motors of the train, a supply circuit extending through the train to which the motor circuits on the several cars are connected in parallel, a second circuit extending through the train, and independent switches on the several cars included in the motor circuits and having auxiliary contacts included in series in said second circuit arranged to close said second circuit, when, and only when, said switches are all in the same position.

In witness whereof, I have hereunto set my hand this 16th day of September, 1911.

MAX R. HANNA.

Witnesses:
 HELEN ORFORD,
 ARTHUR A. BUCK.